Nov. 5, 1968 R. N. CULLIS ET AL 3,409,834

CW INTERFERENCE REDUCTION NETWORK FOR A PULSE COMMUNICATIONS RECEIVER

Filed April 5, 1965 4 Sheets-Sheet 1

FIG. I

*INVENTORS*
ROBERT N. CULLIS
FRANCIS LEON McCORMICK
BY Julian C. Renfro
*ATTORNEY*

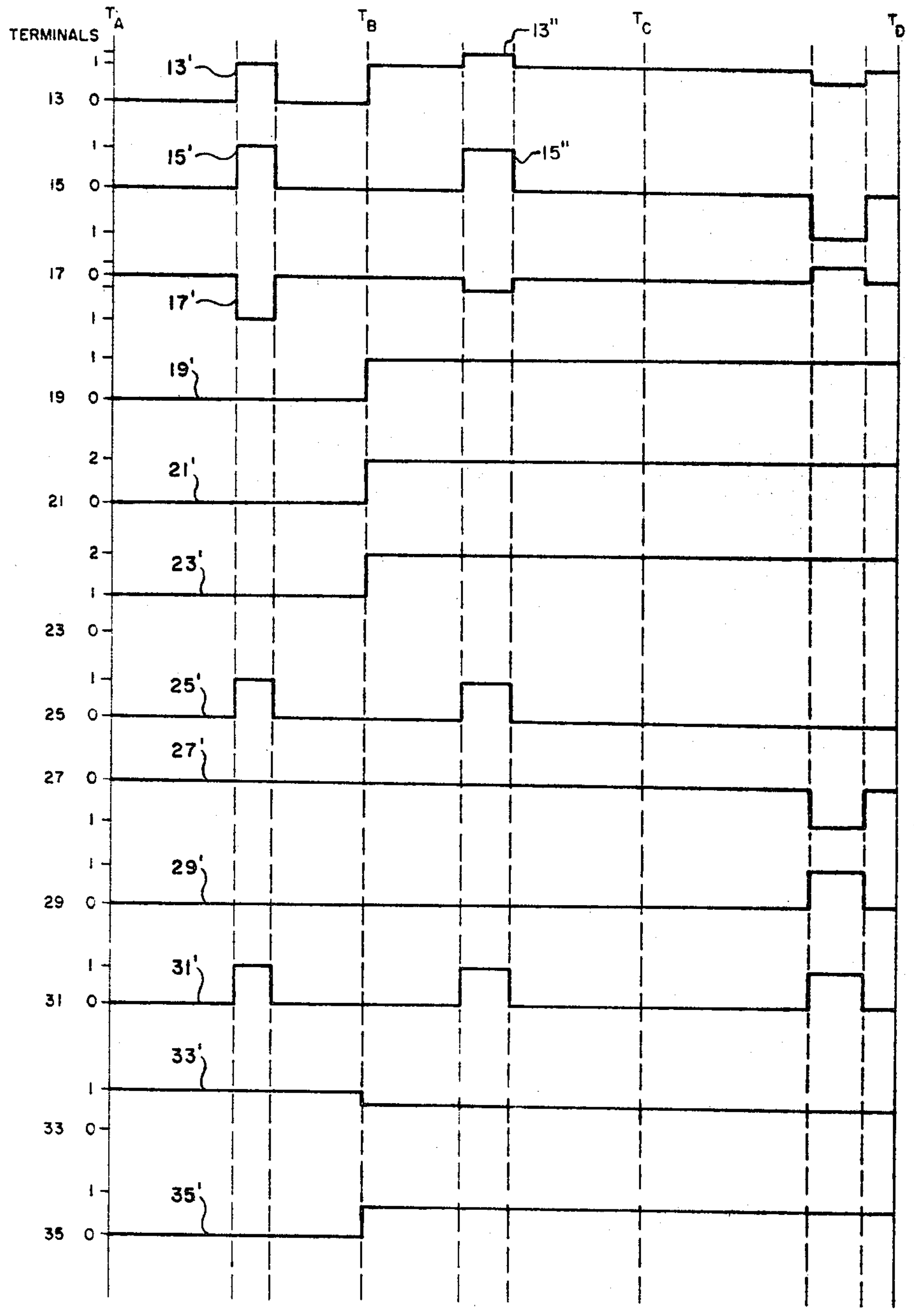
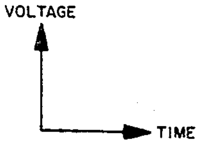
FIG. 2
INVENTORS
ROBERT N. CULLIS
FRANCIS LEON McCORMICK
BY Julian C. Renfro
ATTORNEY INVENTORS
ROBERT N. CULLIS
FRANCIS LEON McCORMICK
BY Julian C. Renfro
ATTORNEY INVENTOR
ROBERT N. CULLIS
FRANCIS LEON McCORMICK
BY Julian C. Renfro
ATTORNEY United States Patent Office 3,409,834

Patented Nov. 5, 1968

3,409,834

CW INTERFERENCE REDUCTION NETWORK FOR A PULSE COMMUNICATIONS RECEIVER

Robert N. Cullis, Orlando, and Francis Leon McCormick, Winter Park, Fla., assignors to Martin-Marietta Corporation, Middle River, Md., a corporation of Maryland Filed Apr. 5, 1965, Ser. No. 445,613
15 Claims. (Cl. 325—324)

ABSTRACT OF THE DISCLOSURE

This invention relates to an interference reduction network usable in conjunction with a pulse receiver of a pulse receiving system, which network serves to extend the dynamic range of the pulse receiver when both pulse modulated and interfering CW carriers are received, comprising means for dynamically varying in an inverse manner with respect to the variation in gain of the receiving means, the amplitude of the received pulses passed by the network, thus maintaining the amplitude of these pulses at a desired value despite the fact that it was necessary to reduce the gain of the receiver due to the presence of a CW carrier.

This invention relates to an immunity network for a pulse receiver that is required to operate in the presence of continuous wave interference occurring within the pass band of the receiver, which network will advantageously allow normal operation of the pulse receiver for a greater dynamic range of continuous wave interference than was previously possible, and more particularly relates to an immunity network whereby an automatic gain control voltage responsive to desired pulse signals is utilized to dynamically change the gain of a variable gain pulse amplifier in the receiver in such a manner as to maintain the amplitude of the desired pulse signals at a value required for normal utilization of such pulse signals. This gain is inversely proportional with respect to the amount of change in the gain of the intermediate frequency amplifier of the receiver that is derived from the interfering continuous wave signal.

An ancillary portion of this invention relates to a pulse inverter and combiner arrangement which improves performance by recovering pulses otherwise lost due to phase opposition of the pulses with continuous wave interference.

In many of the recently developed pulse-coded communication systems, serious problems are encountered regarding pulse demodulation when high energy continuous wave (CW) carriers are concurrently present during communication periods. Regardless of the type of pulse modulation used, the presence of a CW carrier at the input terminal of the receiver of the system contemporaneously with a pulse modulated carrier invariably results in a high percentage of pulse information losses, and when the energy of the CW carrier is of sufficient value to saturate the receiver, pulse information is completely lost.

CW-AGC circuits for automatically controlling the gain of the receiver of the pulse communication system have not been satisfactory, particularly when such systems are intended for military use. That is to say, in a military pulse communication system, it is often necessary that such system be capable of communications in a high power CW jamming environment.

It is of course well known in the pulse communication art that communication systems utlizing pulse modulation formats are highly susceptible to CW jamming, and accordingly the effective operation of such systems, particularly in a military communication network, is severly restricted or ineffective under such conditions. Basically, the CW carrier and the pulse modulated carrier combine at the input terminals of the receiver of the system to form a complex or composite wave having an envelope that proportionally varies in amplitude at the phase or frequency difference of the component carriers. In effect, the CW carrier appears to be amplitude modulated by the pulse modulated carrier. The polarity of this pulse modulation CW carrier at any finite time interval depends upon whether the component signals are in phase and thus completely reinforcing, or out of phase to some degree and thus partially or completely cancelling. Thus, since most pulse communication systems require a given polarity of the demodulated pulse information for initiating the pulse processing circuitry of the system, significant losses of pulse information occur when the energy of the received interfering CW carrier is at least equal to the energy of the pulse modulated carrier. Of course, when the interfering CW carrier has sufficient power to saturate the receiver of the system, the pulse modulated carrier cannot be detected by the receiver and thus the pulse information contained therein is completely lost.

The dynamic range of the receiver of the system can be slightly extended by utilizing the CW carriers in a CW-AGC circuit to control the gain of the receiver, and hence prevent the receiver from reaching saturation. However, as the power of the interfering CW carrier increases, and thus the gain of the receiver is decreased by virtue of the inverse operation of the CW-AGC circuit, the receiver is effectively desensitized with respect to the pulse modulated carrier.

The present invention uniquely increases the overall dynamic range of the pulse communication system a significant amount by utilizing a CW jamming immunity network having a Pulse-AGC circuit for overcoming the undesirable effect of the CW-AGC circuit of the system when the power of the received CW carrier is equal to or greater than the power of the received pulse modulated carrier so as to provide a desired overall or net gain of the system, thus maintaining the amplitude of the pulse signal at a desired level. The present invention also provides a means for detecting both positive and negative polarity pulses and recombining them to produce an output of only one polarity that is necessary to operate standard type threshold or pulse detectors.

In accordance with a preferred embodiment of the present invention, the gain of a variable gain pulse amplifier is varied in an inverse manner with respect to any change in gain of the RF portion of the receiver, thus maintaining the amplitude of the pulse signals above a desired threshold or value. Basically, the output of the variable gain pulse amplifier is coupled to a pulse combining detector wherein the negative pulse components of the signals being processed are detected, inverted and combined with the positive pulse components. The combined signals are then coupled through an integrator to a DC amplifier for developing a first DC voltage proportional to the energy contained in the detected pulses, and represent a Pulse-AGC voltage. At the same time that the first DC voltage is being developed, a second DC voltage is developed which is proportional to the energy contained in the CW carrier, and represents a conventional CW-AGC voltage. Means are provided for coupling either the CW-AGC or the Pulse-AGC DC voltages to the AGC loop circuit of the receiver.

In addition, means are provided for coupling the Pulse-AGC voltage to the variable gain pulse amplifier whenever the energy level of the received CW carrier is equal to or greater than the energy level of the pulse modulated carrier, for varying in a highly advantageous manner, the gain of the variable gain pulse amplifier. This latter function may be achieved by coupling the Pulse-AGC voltage to an AND gate and controlling the AND gate with the CW-AGC voltage. Thus, when the level of the CW-AGC voltage is below a threshold value, the Pulse-AGC voltage is prevented from dynamically varying the gain of the variable gain pulse amplifier so that the overall gain of the receiver will be controlled only by the AGC loop. However, when the level of the CW-AGC voltage exceeds the threshold value, the Pulse-AGC voltage is desirably permitted to vary the gain of the variable gain pulse amplifier so as to increase the dynamic range of the receiver. Accordingly, this unique utilization of both CW-AGC and Pulse-AGC advantageously maintains the amplitude of the pulse signals at a desired value.

It is accordingly a primary object of the present invention to provide a novel immunity network for advantageously extending the usable dynamic range of a pulse receiving system.

It is another object of the present invention to provide a novel immunity network wherein a Pulse-AGC circuit is utilized to change the gain of the immunity network in an inverse manner with respect to the amount of change in the gain of the receiver of the system caused by a CW-AGC circuit so as to provide a desired overall gain of the system.

It is another object of the present invention to provide a novel CW immunity network which significantly increases the overall dynamic range of a pulse type receiver by utilizing a Pulse-AGC circuit for counterbalancing the undesirable effect of the CW-AGC circuit of the system when the power of the received CW carrier is equal to or greater than the power of the received pulse modulated carrier so as to provide a desired overall or net gain of the system and thus maintain the amplitude of the pulse signal at a desired level.

These and further objects and advantages of the present invention will become more apparent upon reference to the drawings in which:

FIGURE 2 depicts waveforms present at several appropriate terminals in the block diagram of FIGURE 1, with pertinent time periods being represented to assist in the detailed explanation of the circuit of FIGURE 1 and its mode of operation;

Figure 1:
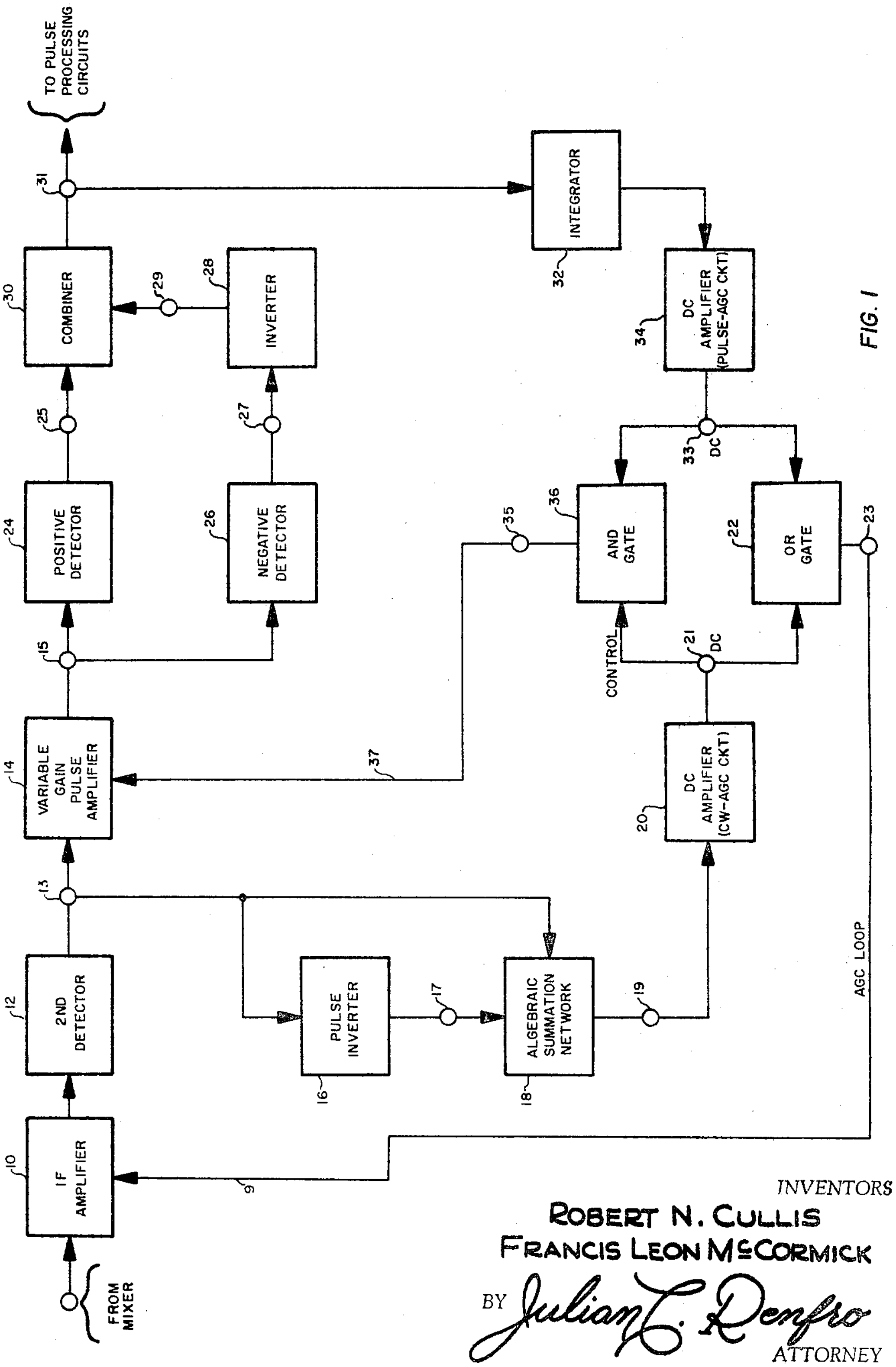
FIGURE 1 is a basic block diagram of the immunity network in accordance with the present invention.
Figure 4:
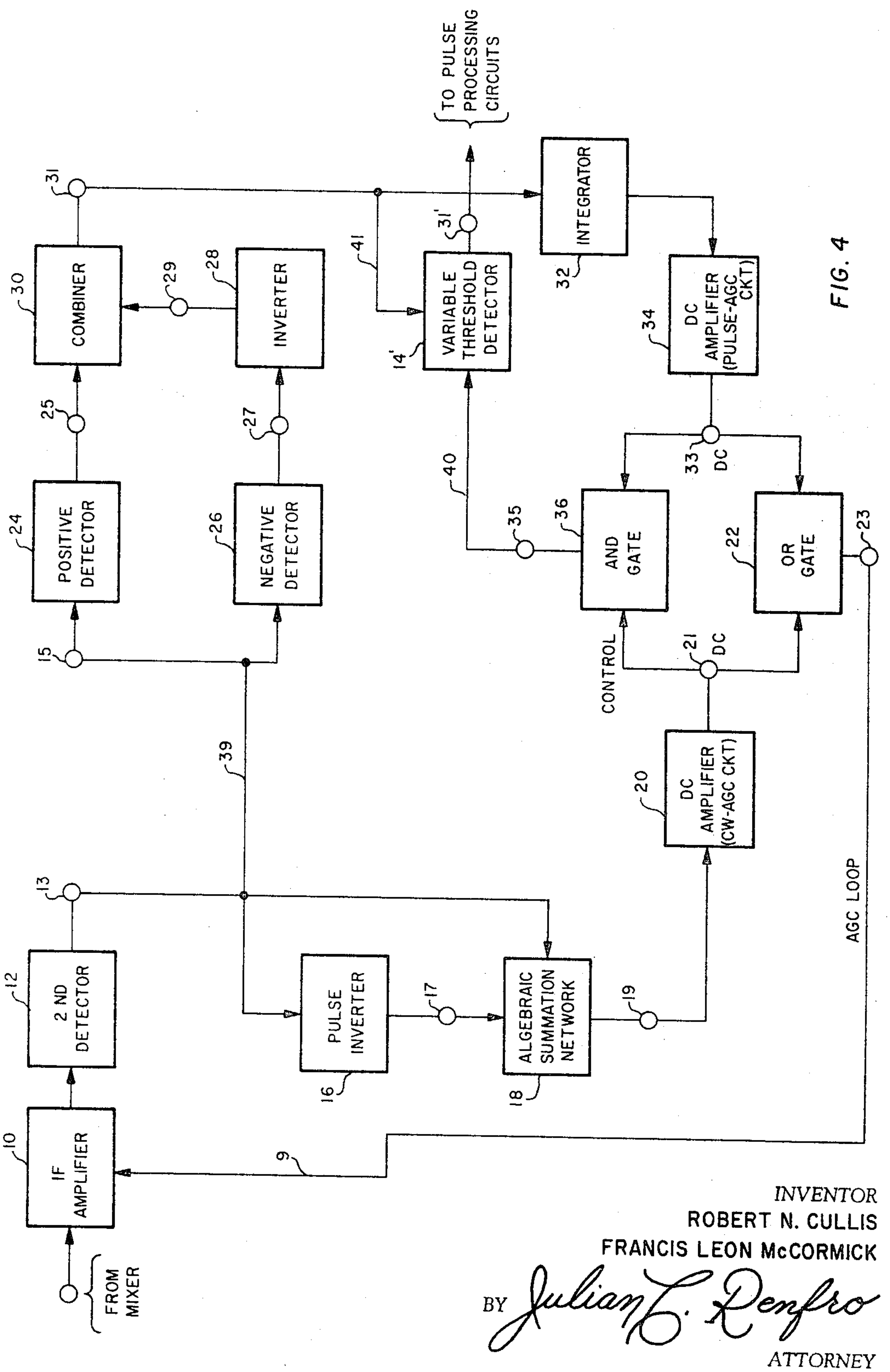
FIGURE 4 is a block diagram somewhat similar to FIGURE 1, but showing an embodiment of our invention in which a variable threshold detector is utilized.

It should first be noted in conjunction with FIGURE 1 that this exemplary embodiment describes the present novel system when the use of a variable gain pulse amplifier is desired, whereas FIGURE 4 reveals an alternate embodiment in dashed lines when the use of a variable threshold detector is desired. As to FIGURE 2, note that the pulse waveforms shown in this figure are idealized as square waves for clarity.

DETAILED DESCRIPTION FIGURES 1 AND 2

In FIGURE 1 is revealed a noise immunity system wherein the pulse modulated energy developed by a conventional mixer circuit (not shown) is applied to an input terminal of the receiving means of the system. As will be noted in the exemplary embodiment in accordance with FIGURE 1, the pulse modulated energy is supplied to IF Amplifier 10, which, with 2nd detector 12, will hereinafter be regarded as the receiving means. However, when used hereinafter in connection with the application of the AGC voltage, it is to be understood that the term "receiving means" is broad enough to include any of a number of locations or stages between the antenna up to and including the 2nd detector. For example, the AGC voltage could be applied to the RF amplifier instead of the IF Amplifier as shown. Therefore, the term "receiving means" is intended to be used in its broad sense, and as will be described at length hereinafter, the AGC voltage meant for the receiving means is of course to be construed to be applied at a suitable stage.

The IF Amplifier 10 and 2nd detector 12 are conventional in that a preselected intermediate frequency (IF) developed by the mixer (not shown) is applied to IF Amplifier 10 and appropriately amplified, while the amplified IF signals developed by the IF Amplifier 10 are coupled to the 2nd detector 12 and appropriately detected and coupled to the output terminal 13.

Note in FIGURE 2 that pulses 13′ and 13″ represent pulses received at terminal 13 during different time periods, and also note that normal operation, with no CW interference present, is represented from time $T_A$ to time $T_B$. As will be seen hereinafter with regard to FIGURE 2, a CW carrier is present during time $T_B$ through $T_C$, and $T_C$ through $T_D$. The energy appearing on terminal 13 represents the energy of both the pulse modulated carrier and the CW carrier (when such CW carrier is present), and contains both video and DC components as seen on line 13 of FIGURE 2.

The pulse signals at terminal 13 are conventionally inverted by the Pulse Inverter 16 and coupled via terminal 17 to the Algebraic Summation Network 18. The composite signal appearing on terminal 13 is also directly coupled to summation network 18 wherein it is combined with the inverted pulse to effectively cancel the pulse signal, thus leaving a DC voltage proportional to the CW carrier, which DC voltage is coupled to a DC Amplifier 20 via terminal 19.

The DC Amplifier 20 is conventional in that it produces a DC voltage which is proportional to the DC energy contained in the CW carrier appearing at terminal 13. This DC voltage is then gated through OR gate 22 and fed back on conductor 9 in a conventional manner as a CW-AGC voltage to the receiving means, which in this exemplary embodiment is IF Amplifier 10, so as to control the gain of amplifier 10 proportional to such DC voltage.

Referring back to terminal 13, the composite wave present thereon is also AC coupled to a Variable Gain Pulse Amplifier 14, which may be a conventional video amplifier, wherein the pulse signals of the composite wave are amplified and coupled via terminal 15 to the Positive and Negative Detectors 24 and 26. It should be noted here that depending upon the phase relationship between the CW carrier and the pulse modulated carrier, alternate cancellation and enhancement occurs as the two signals drift in and out of phase, thus resulting in the pulse envelope being either smaller or larger than the DC component of the composite wave. Accordingly, the use of the Positive and Negative Detectors 24 and 26 in the circuit of FIGURE 1 advantageously permits both the negative and positive swinging pulses present on terminal 15 to be separated and detected. Thus, the positive swinging pulses will appear at terminal 25 while the negative swinging pulses will appear at terminal 27.

The positive swinging pulses appearing at terminal 25 are then coupled to Combiner 30, while the negative swinging pulses appearing at terminal 27 are first inverted by Inverter 28 and then coupled to the Combiner 30 via terminal 29. The output of Combiner 30 appears at terminal 31 and is appropriately coupled to conventional pulse processing circuits (not shown) of the communication receiver to which this invention is applied.

The output from the combiner is also connected to integrator 32. This latter device performs essentially the action of an integrator in that it produces at its output a steady DC voltage proportional to the amplitude of the pulses of the pulse stream present at its input. The output of integrator 32 is then coupled to a DC Amplifier 34, which is conventional in that it produces a DC voltage proportional to the energy contained in the pulse signal appearing at the output of the Integrator 32. The DC output of the DC Amplifier 34 is then coupled to both the OR Gate 22 and the AND Gate 36 via terminal 33. It should be noted here that the DC voltage on terminal 33 will be coupled to the IF Amplifier 10 via the OR Gate 22, terminal 23 and conductor 9, whenever the DC voltage on terminal 21 is less than such DC voltage appearing on terminal 33. In addition, the DC voltage appearing on terminal 33 will be gated to terminal 35 and thence to pulse amplifier 14 whenever the DC voltage on terminal 21 exceeds a predetermined or desired level.

In the circuit of FIGURE 1, AND Gate 36 is preferably designed to be opened or gated so as to pass the voltage level on terminal 33 only when the DC voltage on terminal 21 exceeds the DC voltage on terminal 33, and OR Gate 22 is designed to pass the higher DC voltage present on terminals 21 and 33. By "higher" is of course meant the terminal on which the greater energy is present. Thus, a DC voltage from the Pulse-AGC circuit will appear on terminal 35 whenever the energy of the CW carrier exceeds the energy of the pulse modulated carrier by a predetermined amount. Accordingly, the DC voltage appearing on terminal 35 is advantageously utilized to increase the gain of the pluse amplifier 14 proportional to the value of such DC voltage by coupling these voltages to the pulse amplifier 14 via conductor 37. In addition, the OR Gate 22 will couple only the higher DC voltage appearing on terminals 21 and 33 to terminal 23, which higher DC voltage is utilized as the AGC voltage for the receiving means.

MODE OF OPERATION—FIGURES 1 AND 2

Let it be assumed that during time period $T_A$–$T_B$ shown in FIGURE 2, only a pulse modulated carrier is received and processed by the receiver of the system. Note during time period $T_A$–$T_B$ that the first pulse 13′ present on terminal 13 is inverted by inverter 16 (see waveform 17′) and coupled to Summation Network 18, wherein pulses 13′ and 17′ are algebraically summed, thus resulting in cancellation of the time coincident positive and negative pulses of these waveforms. Of course, since no CW carrier is present during time period $T_A$–$T_B$, the output of the Summation Network 18 that is supplied to terminal 19 is at zero volts DC. Therefore, line 19 of FIGURE 2 depicts zero volts during the period $T_A$–$T_B$, and inasmuch as no DC voltage is produced by the DC Amplifier 20 at this time, the line 21 also depicts zero volts. It should also be observed that no CW-AGC voltage is coupled to the IF Amplifier 10 via OR Gate 22 and Conductor 9 at this time.

Referring to terminal 13, with regard to the Pulse-AGC circuit, let it be assumed that the gain of the pulse amplifier 14 is unity during time period $T_A$–$T_B$. Thus, wareform 13′ will be coupled to amplifier output terminal 15 without amplification (see waveform 15′) and will pass through the Positive Detector 24 and Combiner 30 to the terminal 31. Note waveform 31′. Integrator 32, as previously mentioned, produces at its output a steady DC voltage proportional to the amplitude of the pulses of the pulse stream present at its input, and this DC voltage is coupled to the DC Amplifier 34. Note in connection with the output of DC Amplifier 34 appearing on terminal 33 that the DC level of waveform 33′ of FIGURE 2 is a result of a relatively long time average of the integration and DC amplification of several consecutive pulses received prior to time $T_A$. Thus, the pulse received during time period $T_A$–$T_B$ maintains the DC level as shown in this line of FIGURE 2.

The DC voltage on terminal 33 is coupled to the OR Gate 22 and utilized in a conventional manner to control the gain of the IF Amplifier 10. In addition, the DC voltage on terminal 33 is coupled to the AND Gate 36 but will not be utilized to vary the gain of the pulse amplifier 14 since the AND Gate 36 is closed when the DC voltage at terminal 21 is less than the DC voltage at terminal 33, such as is the case when no CW carrier is received.

Let it now be assumed that during time period $T_B$–$T_C$ depicted on FIGURE 2 that both a CW carrier and a pulse modulated carrier are received by the system, and that the energy of the CW carrier exceeds the energy in the pulse modulated carrier by a predetermined amount. In addition, let it be assumed that the phase relationship between the CW and pulse modulated carriers is such that the resultant effect is positive, or to say it otherwise, the carriers are substantially in phase. It should be recalled here that the DC voltages developed by the DC Amplifiers 20 and 34 are utilized to provide AGC for the receiving means via the AGC loop feedback to the IF Amplifier 10. Thus, when the average DC of the CW carrier exceeds the average DC of the pulse modulated carrier by a predetermined amount, the receiver IF amplifier will be undesirable desensitized with respect to the pulse.

To counterbalance this disadvantageous condition, the Pulse-AGC circuit in accordance with this invention is utilized to dynamically vary the pulse amplifier 14 in an inverse manner with respect to the variation in gain of the receiver IF amplifier 10 caused by the CW-AGC circuit. Accordingly, the pulse amplifier 14 amplifies the low-level pulse 13″ present during time period $T_B$–$T_C$, whereupon such amplified pulse shown as 15″, is detected by Pulse Detector 24 (see waveform 25′), combined in Combiner 30 (see waveform 31′) and coupled to the DC Amplifier 34 via terminal 31 and integrator 32. The DC amplifier 34 then develops a DC voltage (see waveform 33′), which voltage appears at terminal 33. Note at this point that during time period $T_B$–$T_C$, the DC voltage on terminal 21 exceeds the DC voltage on terminal 33 (see waveforms 21′ and 33′). Therefore, AND Gate 36 is now open and the DC voltage on terminal 33 is coupled to the pulse amplifier 14 via terminal 35 and conductor 37, to control the gain of this amplifier. It will be apparent here that when both a CW carrier and a pulse modulated carrier are received by the receiver, and the average DC of the CW carrier exceeds by a predetermined amount the average DC of the pulse modulated carrier, the gain of the pulse amplifier 14 is, in accordance with this invention, dynamically varied by the Pulse-AGC circuit in an inverse manner with respect to the variation of the gain of the receiving means caused by the CW-AGC circuit, i.e., as the gain of the receiving means is reduced, the gain of the pulse amplifier 14 is desirably increased.

Let it now be assumed that during time period $T_C$–$T_D$ both a CW carrier and a pulse modulated carrier are again received by the system, and that the energy in the CW carrier exceeds the energy in the pulse modulated carrier by an amount such that the DC voltage at 21 exceeds the DC voltage at 33. During this time period, however, the phase relationship between the CW and pulse modulated carriers is such that the resultant effect is negative, i.e., the carriers are substantially out of phase. The circuit of FIGURE 1 functions during time period $T_C$–$T_D$ in the same manner as above described regarding time period $T_B$–$T_C$ except now the amplified pulse developed by pulse amplifier 14 is detected by the Negative Detector 26 (see waveform 27′), inverted by inverter 28 (see waveform 29′) combined in Combiner 30 (see waveform 31′) and coupled to the DC Amplifier 34 via terminal 31 and integrator 32. The DC Amplifier 34 again develops a DC voltage (see waveform 33′) at terminal 33. Again the DC voltage on terminal 21 exceeds the DC voltage on terminal 33, thus opening AND Gate 36 and gating the DC voltage on terminal 33 to the pulse amplifier 14 via terminal 35 and Conductor 37. Thus, during time period $T_C$–$T_D$, the gain of the pulse amplifier 14 is again dynamically varied by the Pulse-AGC circuit in an inverse manner with respect to the variation of the gain of the receiver caused by the CW-AGC circuit.

Figure 3:
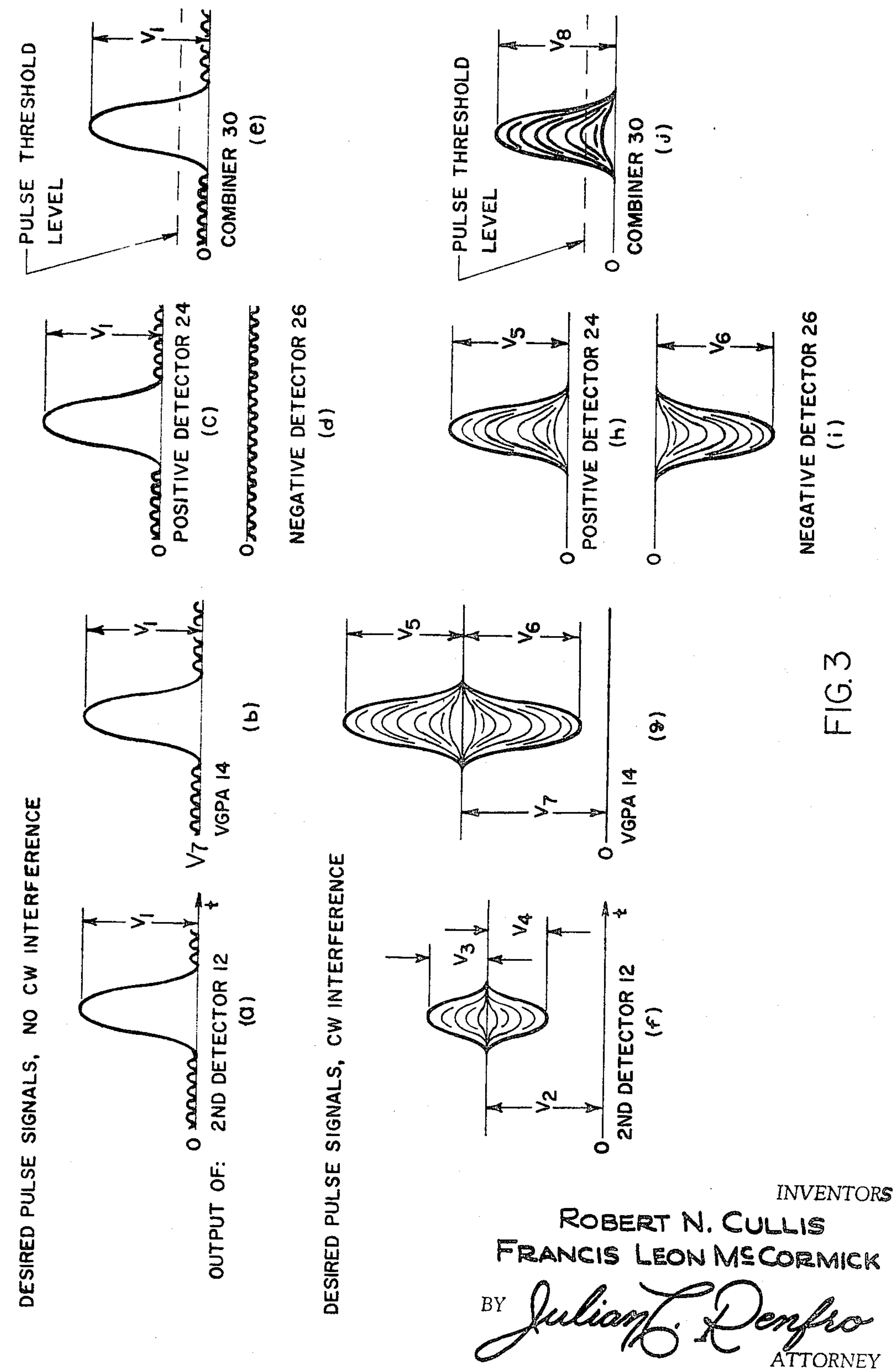
FIGURE 3 is a series of waveforms showing desired pulse signals, first without CW interference, and then with CW interference.

Whereas FIGURE 2 has shown idealized pulse waveforms in a time-sequential manner at indicated points of the block diagram of FIGURE 1, FIGURE 3 represents actual waveforms which are observed by oscillographic viewing at various points in the system, the waveforms representing a large number of repetitive traces of the oscilloscope. The desirable features of this invention may thus be more clearly evident from this representation.

Referring to the presentation of pulses on the upper line of FIGURE 3, waveform (*a*) represents the output of 2nd detector 12 to a desired pulse signal input with no CW carrier interference present. Normally, a pulse with amplitude $V_1$ is obtained with a low level of noise which appears during the time interval between pulses. The amplitude $V_1$ is determined by the gain of IF amplifier 10 which gain is controlled by the AGC voltage from Integrator 32 and DC amplifier 34 as previously described. This AGC loop follows well-known principles of the art to maintain the desired pulse at or near the required amplitude $V_1$.

Waveform (*b*) is the output of variable gain pulse amplifier 14. This waveform also is depicted as $V_1$ inasmuch as its ampltude will be the same as at the second detector output when the gain of the variable gain pulse amplifier 14 is unity and constant for this condition. However, it is clear that this gain may be constant and greater than unity if required for a specific application of this invention.

The output of positive detector 24, which receives the positive going pulse of waveform (*b*) is shown at (*c*) and is unchanged. However, the output of negative detector 26 at (*d*) contains only noise since at this time there is no negative going pulse at the output of pulse amplifier 14. The waveform (*e*) represents the output of combiner 30 and is the superposition of waveforms (*c*) and (*d*).

By way of contrast, refer now to the presentation of pulses on the lower line of FIGURE 3, which represents the system with desired pulse signals and with an interfering CW carrier signal of greater amplitude than such desired pulses.

Waveform (*f*) represents the output of second detector 12, with $V_2$ being the DC level due to the CW carrier. Here, this level is controlled by the gain of IF amplifier 10 which has its gain controlled by the CW-AGC circuit 20 as previously described. Assuming the CW signal and desired pulse signals are independent, the varying phase relations between these signals cause pulses to appear with both positive and negative amplitudes. Furthermore, the amplitude of such pulses will vary from zero to $V_3$ in the positive direction and from zero to $V_4$ in the negative direction, the value of $V_3$ and $V_4$ being determined by the relative difference in energy between the desired pulse signal and CW carrier signal. Waveform (*f*) depicts these multiple pulses as would be seen on an oscillographic recording where a large number of sequential traces are superimposed, thereby showing a large number of pulses of varying amplitudes as the phase progressively changes between pulse signals and the CW carrier signal.

Waveform (*g*) is the output of VGPA 14, to which the output of detector 12 is coupled in such a manner as to pass the AC pulse components and to block the DC component. This amplifier now has a gain greater than unity, having been controlled by the voltage at the output of DC amplifier 34 in such a manner as to increase its gain in accordance with this invention, as previously described.

As will be seen by comparing waveform (*f*) and waveform (*a*) of FIGURE 3, $V_3$ and $V_4$ are smaller than $V_1$. However, $V_5$ and $V_6$ of waveform (*g*) are each essentially equal to $V_1$, having of course been amplified by VGPA 14. $V_7$ is the normal bias voltage level of VGPA 14. Thus, a principal object of the invention of effectively compensating for the reduction of the receiver gain and consequent reduction in pulse amplitude due to CW-AGC action has been brought about.

Waveforms (*h*) and (*i*) are the outputs of positive detector 24 and negative detector 26 respectively for the waveform of (*g*). Here, $V_5$ and $V_6$ are of the same value as in waveform (*g*) and represent the positive and negative going AC components of waveform (*g*). Waveform (*j*), which involves a voltage of value $V_8$, is the output of combiner 30 and represents the linear superposition of waveform (*h*), and waveform (*i*), after inversion in inverter 28. This output is now of course delivered to the pulse processing circuits. Note FIGURE 1.

It should be noted that during the occurrence of a pulse at the output of the positive detector 24 there will be no pulse at the output of negative detector 26 and vice versa. These two possible conditions are mutually exclusive. In prior art systems, negative going pulses resulting from interaction of the CW interfering carrier and the desired pulse have been lost since the prior art pulse threshold detector circuits necessarily used do not respond to both positive and negative going pulses. In combiner 30, therefore, the inverted negative pulses are reinserted into the pulse stream. Here another objective of the invention is accomplished, that is, that pulses which would otherwise be lost due to phase cancellation are recovered.

It should be noted that FIGURE 4 discloses an alternate embodiment wherein a variable threshold detector (VTD) 14' may be utilized in lieu of variable gain pulse amplifier 14 of FIGURE 1. Conductor 39 connects terminals 13 and 15, whereas conductor 40 connects the AND Gate 36 to one input terminal of the VTD 14' via terminal 35, and conductor 41 connects the Combiner 30 to the other input terminal of the VTD 14' via terminal 31. The output of the VTD 14' is then coupled to conventional pulse processing circuits (not shown) via terminal 31'.

The operation of the circuit in accordance with FIGURE 4 is in the most part the same as previously described in connection with the pulse amplifier embodiment, except that the threshold of the detector 14' is dynamically varied in response to the DC voltage developed by the DC amplifiers 20 and 34. That is to say, when the energy contained in the CW carrier exceeds by a predetermined value, the energy contained in the pulse modulated carrier, the AND Gate 36 is opened and a DC voltage relatively proportional to the energy appearing on terminal 33 is coupled to terminal 35 so as to vary the threshold of the VTD 14'. Thus, by lowering the threshold of detector 14' whenever the pulse signals are reduced in amplitude by the CW-AGC circuit, such low level pulse will be detected by the VTD 14' and appropriately coupled to subsequent circuitry, such as to the pulse processing circuits of the system. Of course, as the receiver gain increases under control of CW-AGC, the circuit and the amplitude of the pulse signal increases, and the threshold of the VTD 14' will be dynamically increased again in response to the DC voltage coupled to the VTD 14' via AND Gate 36 and Terminal 35.

It should be noted that the principles set forth in conjunction with the above-described embodiments of our novel interference reduction network can also be used to effectively increase the dynamic range of a pulse receiver in the presence of AM and/or FM interference within limitations, such as whenever the amplitude of the interfering signal is not changing at such a rate as to degrade the performance of the interference reduction network.

As will now be apparent to those skilled in the art, we have provided a highly effective interference reduction network usable in conjunction with the pulse receiver of a pulse receiving system for extending the dynamic range of such pulse receiver when both pulse modulated and CW carriers are received. Out network of course comprises means such as a variable gain pulse amplifier for dynamically varying in an inverse manner with respect to the variation in gain of the receiving means, the amplitude of the video component passed by the network when the interference resulting from a CW carrier has reached a preselected level, thereby increasing the amplitude of the video component to a desired value when the gain of the receiving means is reduced due to DC components resulting from detection of such CW carrier, and extending the dynamic range of the system.

A further facet of our invention of course involves the reinsertion technique utilized to counteract the interaction occurring between the pulse modulated and CW carriers. This interaction results in periodic reinforcement and cancellation, producing positive going and negative going envelopes representative of such combined pulse modulated and CW carriers. Our novel technique utilizes means for inverting the negative going envelopes and reinserting same as positive going envelopes in the stream of positive going envelopes, thereby reducing the loss of such negative going envelopes due to CW interference.

The terms and expressions which have been employed herein are used as terms of description and not limitation, and it is not intended, in the use of such terms and expressions, to exclude any equivalents of the features shown and described, or portions thereof, and it is to be recognized that various modifications are possible within the scope of the appended claims.

We claim:

1. An interference reduction network usable in conjunction with the pulse receiver of a pulse receiving system for extending the dynamic range of such pulse receiver when both pulse modulated and CW carriers are received, such pulse receiver including variable gain receiving means for detecting the pulse modulated and CW carriers received and for developing a composite signal having both video and DC components, and said network comprising means for dynamically varying in an inverse manner with respect to the variation in gain of the receiving means, the amplitude of the video component passed by said network when the interference resulting from the CW carrier has reached a preselected level, thereby increasing the amplitude of said video component to a desired value when the gain of the variable gain receiver means is reduced due to DC components resulting from detection of such CW carriers, and extending the dynamic range of said system.

2. The network as defined in claim 1 in which said means for varying the amplitude of the video component includes a variable gain pulse amplifier.

3. The network as defined in claim 1 in which said means for varying the amplitude of the video component includes a variable threshold detector.

4. The network as defined in claim 1 in which interaction occurs between said pulse modulated and CW carriers such that periodic reinforcement and cancellation take place, thus producing a stream of positive-going and negative-going envelopes, and in which means are provided for inverting and reinserting into said stream of positive-going envelopes of video components, those negative-going video components resulting from such interaction of the CW carrier and the video components.

5. An interference reduction network usable in conjunction with the pulse receiver of a pulse receiving system for extending the dynamic range of such pulse receiver when both pulse modulated and CW carriers are received, and wherein interaction occurs between the pulse modulated and CW carriers such that periodic reinforcement and cancellation take place, thus producing a stream of positive-going and negative-going envelopes representative of such combined pulse modulated and CW carriers, and where such pulse receiver includes variable gain receiving means for detecting the pulse modulated and CW carriers received and for developing a composite signal having both video and DC components, said network comprising means for dynamically varying in an inverse manner with respect to the variation in gain of the receiving means, the amplitude of the video component passed by said network when the interference resulting from the CW carrier has reached a preselected level, thereby maintaining the amplitude of said vedeo component at a desired value, and means for inverting said negative going envelopes and reinserting same as positive going envelopes in said stream of positive going envelopes, thereby reducing the loss of such negative going envelopes due to CW interference.

6. An interference reduction network usable in conjunction with the pulse receiver of a pulse receiving system for extending the dynamic range of such pulse receiver when both pulse modulated and CW carriers are received, wherein such pulse receiver includes variable gain receiving means for detecting the pulse modulated and CW carriers received and for developing a composite signal having both video and DC components, said network comprising:

(a) first and second automatic gain control circuits in which first and second DC control voltages proportional to the energy contained in the video and DC components, respectively, are developed;

(b) means for dynamically varying the gain of the receiving means in proportion to the larger one of said first and second DC control voltages; and (c) means for dynamically varying in an inverse manner with respect to the variation in gain of the receiving means, the amplitude of the video component passed by said network when said second DC control voltage is larger than said first DC control voltage, so as to maintain the amplitude of said video component at a desired value and thereby extend the dynamic range of said system.

7. The network defined in claim 6 in which said means for varying the amplitude of the video component includes a variable gain pulse amplifier.

8. The network defined in claim 6 in which said means for varying the amplitude of the vedeo component includes a variable threshold detector.

9. An interference reduction network usable in conjunction with the receiver of a pulse receiving system for extending the dynamic range of such pulse receiving system when both pulse modulated and CW carriers are received, such pulse receiver including receiving means for detecting the pulse modulated and CW carriers received by said system, and for developing a composite signal having both video and DC components, said network comprising:

(a) means for dynamically varying the gain of the receiving means in inverse proportion to the energy contained in the larger one of said video and DC components, (b) pulse amplifier means arranged to receive the output of the receiving means, and (c) means for dynamically varying the gain of said pulse amplifier means in an inverse manner with respect to said variation in gain of the receiving means so as to maintain the amplitude of said video component at a desired value and thereby extend the dynamic range of said system.

10. The network as defined in claim 9 in which interaction occurs between said pulse modulated and CW carriers such that periodic reinforcement and cancellation take place, thus producing a stream of positive-going and negative-going envelopes, and in which means are provided for inverting and reinserting into said stream of positive-going envelopes of video components, those negative-going video components resulting from such interaction of the CW carrier and the video components.

11. Interference reduction means for extending the dynamic range of a pulse receiving system when both pulse modulated and CW carriers are received by said system, said means comprising in combination:

(a) receiving means for detecting said pulse modulated and CW carriers and developing a composite signal having both video and DC components,
(b) pulse amplifier means arranged to receive the output of said receiving means.
(c) means for developing first and second DC voltages respectively proportional to the energy contained in the video and DC components.
(d) first feedback means responsive to said first and second DC voltages for dynamically varying the gain of said receiving means, and
(e) second feedback means responsive to said first DC voltage, when said second DC voltage exceeds a predetermined level, for dynamically varying the gain of said pulse amplifier means in an inverse manner with respect to the variation in gain of said receiving means so as to maintain the amplitude of said video component at a desired value and thereby extend the dynamic range of said system.

12. Interference reduction means for extending the dynamic range of a pulse receiving system and maintaining the amplitude of a received pulse modulated carrier at a desired value during periods in which one or more CW carriers may simultaneously arrive, said means comprising, in combination:
(a) receiving means for detecting said pulse modulated and CW carriers and developing a composite signal having both video and DC components,
(b) means for developing first and second DC voltages respectively proportional to the energy contained in said video and DC components,
(c) pulse amplifier means arranged to receive the output of said receiving means,
(d) first gating means for coupling the larger one of said first and second DC voltages to said receiving means so as to dynamically vary the gain of said receiving means in proportion to the larger DC voltage, and
(e) second gating means for coupling said first DC voltage to said pulse amplifier means when said second DC voltage exceeds said first DC voltage so as to dynamically vary the gain of said pulse amplifier means in proportion to said first DC voltage, thereby maintaining the amplitude of said video component at a desired value and extending the dynamic range of said system.

13. Interference reduction means in accordance with claim 12 wherein said first gating means is an OR gate having two input terminals and one output terminal, said first and second DC voltages being respectively coupled to the input terminals of said OR gate and said output terminal of said OR gate being coupled to said receiving means.

14. Interference reduction means in accordance with claim 12 wherein said second gating means is an AND gate having two input terminals and an output terminal, said first and second DC voltages being respectively coupled to the input terminals of said AND gate, and said output terminal of said AND gate being coupled to said pulse amplifier means.

15. Interference reduction means for extending the dynamic range of a pulse receiving system and maintaining the amplitude of a received pulse modulated carrier at a desired value during periods in which one or more CW carriers may simultaneously occur, said means comprising, in combination:
(a) receiving means for detecting said pulse modulated and CW carriers and for developing a composite signal having both video and DC components, said pulse modulated and CW carriers having a phase relationship which causes alternate cancellation and enhancement of said carriers thereby causing the video component alternately to swing positive and negative,
(b) pulse amplifier means arranged to receive the output of said receiving means,
(c) positive and negative detector means for respectively detecting said positive and negative video components;
(d) inverter means for inverting the detected negative video component;
(e) combining means for combining the detected positive video component and the inverted negative video component;
(f) means for developing first and second DC voltages respectively proportional to the energy contained in the combined positive and negative video components and the DC component,
(g) first gating means for coupling the larger one of said first and second DC voltages to said receiving means so as to dynamically vary the gain of said receiving means in porportion to the larger DC voltage, and
(h) second gating means for coupling the first DC voltage to said pulse amplifier means when said second DC voltage exceeds said first DC voltage, so as to dynamically vary the gain of said pulse amplifier means in porportion to said first DC voltage and in an inverse manner with respect to said variation in gain of said receiver means, thereby maintaining the amplitude of said video component at a desired value and extending the dynamic range of said system.

References Cited

UNITED STATES PATENTS

| | | | |
|---|---|---|---|
| 2,760,059 | 8/1956 | Rogers | 330—133 X |
| 2,866,015 | 12/1958 | Sailor | 325—404 X |
| 3,034,119 | 5/1962 | Durbin et al. | 330—133 X |

ROBERT L. GRIFFIN, *Primary Examiner.*

J. T. STRATMAN, *Assistant Examiner.*